(12) United States Patent
Sunaga

(10) Patent No.: US 12,164,984 B2
(45) Date of Patent: Dec. 10, 2024

(54) RECORDING APPARATUS AND METHOD OF CONTROLLING RECORDING APPARATUS COMPRISING DETERMINING A POSSIBILITY OF REPLENISHMENT OF PAPER IN THE MANUAL PAPER FEED SECTION BASED ON PRESENCE OR ABSENCE OF PAPER SET ON THE MANUAL PAPER FEED SECTION

(71) Applicant: SEIKO EPSON CORPORATION, Tokyo (JP)

(72) Inventor: Yasuo Sunaga, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/479,225

(22) Filed: Oct. 2, 2023

(65) Prior Publication Data
US 2024/0111980 A1    Apr. 4, 2024

(30) Foreign Application Priority Data
Oct. 4, 2022    (JP) .................................. 2022-160049

(51) Int. Cl.
*G06K 15/00* (2006.01)
*B65H 7/04* (2006.01)
*B65H 7/14* (2006.01)
*B65H 7/18* (2006.01)
*G06F 3/12* (2006.01)
*G06K 15/16* (2006.01)
*H04N 1/00* (2006.01)

(52) U.S. Cl.
CPC .......... *G06K 15/4065* (2013.01); *B65H 7/04* (2013.01); *B65H 7/14* (2013.01); *G06K 15/16* (2013.01); *G06K 15/408* (2013.01)

(58) Field of Classification Search
CPC .......... H04N 1/00681; H04N 1/00687; H04N 1/00689; H04N 1/00692; H04N 1/00694; H04N 1/00763; H04N 1/00777; H04N 1/00779; H04N 1/107; H04N 1/1074
USPC ................................................ 358/1.11–1.18
See application file for complete search history.

(56) References Cited

U.S. PATENT DOCUMENTS

| 2013/0321865 | A1* | 12/2013 | Hikichi | .............. G06K 15/4065 |
| | | | | 358/1.15 |
| 2015/0360892 | A1* | 12/2015 | Yoshimizu | ............. B65H 3/523 |
| | | | | 358/1.12 |
| 2015/0368054 | A1* | 12/2015 | Kowase | .................. B65H 7/02 |
| | | | | 271/265.02 |
| 2019/0112140 | A1* | 4/2019 | Harano | ................ G06K 15/002 |
| 2020/0225609 | A1 | 7/2020 | Tao | |

FOREIGN PATENT DOCUMENTS

| JP | 3560903 | B2 | * | 9/2004 |
| JP | 2005247482 | A | * | 9/2005 |
| JP | 2020-111025 | A | | 7/2020 |

\* cited by examiner

*Primary Examiner* — Chad Dickerson
(74) *Attorney, Agent, or Firm* — WORKMAN NYDEGGER

(57) ABSTRACT

A recording apparatus that performs recording according to printing request data includes: a manual paper feed section in which a plurality of sheets of paper are settable at once; a detection section that detects the presence or absence of the paper set in the manual paper feed section; and a determination section that determines a possibility of replenishment of the paper in the manual paper feed section based on an output of the detection section.

7 Claims, 7 Drawing Sheets

RECORDING APPARATUS AND METHOD OF CONTROLLING RECORDING APPARATUS COMPRISING DETERMINING A POSSIBILITY OF REPLENISHMENT OF PAPER IN THE MANUAL PAPER FEED SECTION BASED ON PRESENCE OR ABSENCE OF PAPER SET ON THE MANUAL PAPER FEED SECTION

The present application is based on, and claims priority from JP Application Serial Number 2022-160049, filed Oct. 4, 2022, the disclosure of which is hereby incorporated by reference herein in its entirety.

BACKGROUND

1. Technical Field

The present disclosure relates to a recording apparatus such as a printer.

2. Related Art

For example, JP-A-2020-111025 discloses an image forming apparatus that is an example of a recording apparatus that forms an image on a medium that is an example of paper. The image forming apparatus includes a manual paper feed tray and a paper feed section, which are examples of a manual paper feed section, and a remaining amount sensor, which is an example of a detection section. The manual paper feed tray is provided outside the image forming apparatus in such a way as to be openable and closable. The paper feed section feeds the medium loaded on the manual paper feed tray with paper feed rollers. The remaining amount sensor detects the medium loaded on the manual paper feed tray.

In some cases, the manual paper feed section waits in a state in which paper, before being fed, is pinched between the paper feed rollers during a period from the end of the previous printing to the start of the next printing. When new paper is replenished in the manual paper feed section in a state in which the paper is pinched between the paper feed rollers, a feed error may occur.

SUMMARY

According to an aspect of the present disclosure, a recording apparatus that performs recording according to printing request data includes: a manual paper feed section in which a plurality of sheets of paper are settable at once; a detection section that detects the presence or absence of the paper set in the manual paper feed section; and a determination section that determines a possibility of replenishment of the paper in the manual paper feed section based on an output of the detection section.

DESCRIPTION OF EMBODIMENTS

Figure 1:
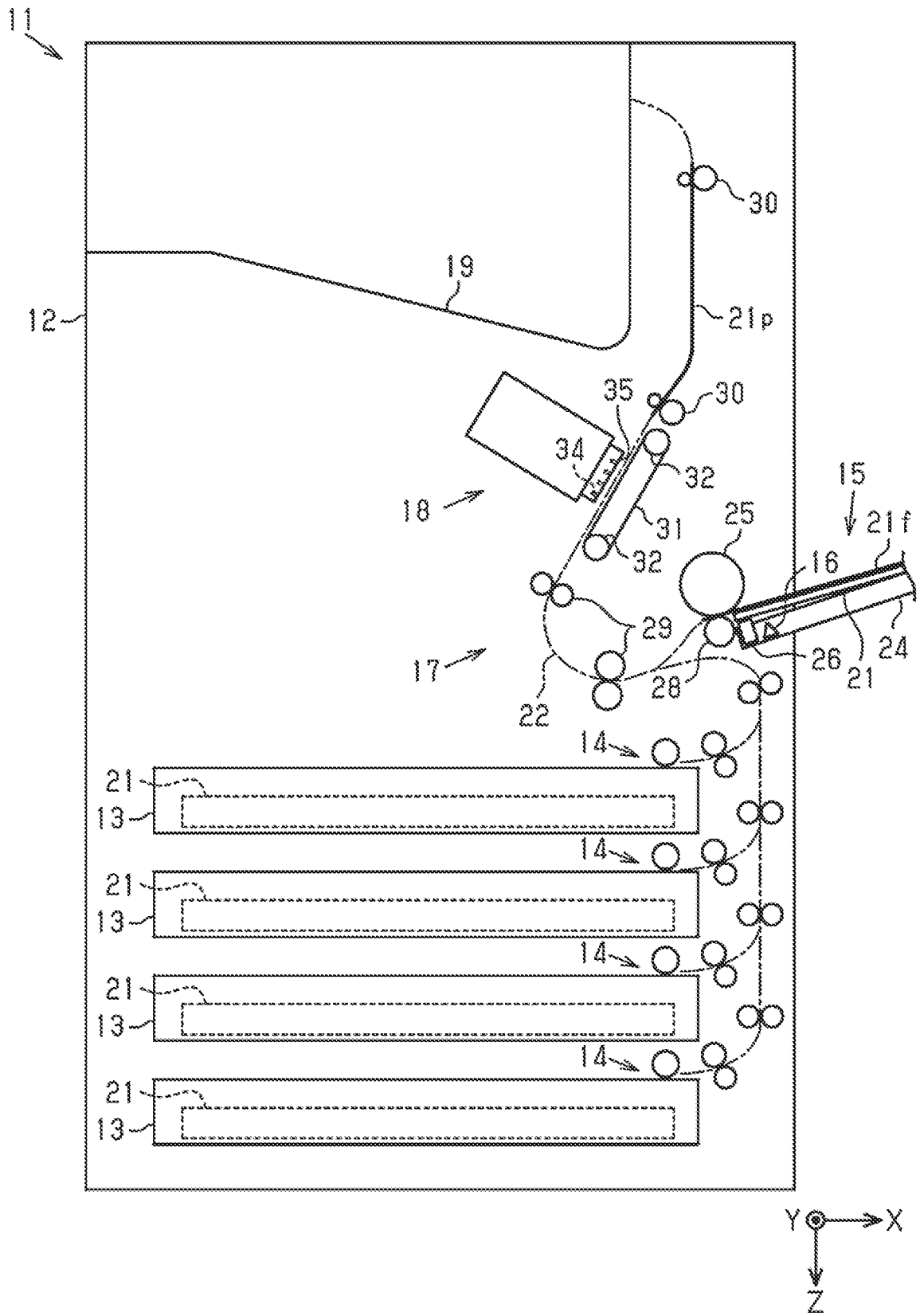
FIG. 1 is a schematic view of a recording apparatus according to an embodiment.

Hereinafter, a recording apparatus according to an embodiment will be described with reference to the drawings. A recording apparatus according to the present embodiment is an ink jet printer that performs printing by ejecting ink, which is an example of a liquid, onto paper such as a template paper, a postcard, a business card, a card, plain paper, high-quality paper, recycled paper, glossy paper, coated paper, or matte paper. In the drawings, a direction of gravity is indicated by a Z axis assuming that a recording apparatus 11 is placed on a horizontal plane, and directions along the horizontal plane are indicated by an X axis and a Y axis. The X axis, the Y axis, and the Z axis are orthogonal to one another.

Recording Apparatus

As illustrated in FIG. 1, the recording apparatus 11 may include a housing 12, an accommodation cassette 13, and a cassette paper feed section 14. The recording apparatus 11 includes a manual paper feed section 15 and a detection section 16. The recording apparatus 11 may include a transport section 17, a recording section 18, and a stacker 19. The recording apparatus 11 may include a plurality of accommodation cassettes 13 and the same number of cassette paper feed sections 14 as the accommodation cassettes 13.

In FIG. 1, a transport path 22 along which paper 21 is transported is indicated by a line with alternating long and short dashes. The transport path 22 is a path that connects the accommodation cassette 13 and the stacker 19, and is a path that connects the manual paper feed section 15 and the stacker 19. The transport path 22 extending from the accommodation cassette 13 and the transport path 22 extending from the manual paper feed section 15 may join midway.

The accommodation cassette 13 may be capable of accommodating a plurality of sheets of paper 21 in a stacked state. The cassette paper feed section 14 feeds the sheets of paper 21 accommodated in the accommodation cassette 13 one by one from the corresponding accommodation cassette 13 to the transport path 22. The cassette paper feed section 14 has a known structure, and therefore a detailed description thereof will be omitted.

Manual Paper Feed Section

The manual paper feed section 15 may include a manual paper feed tray 24, a paper feed roller 25, and a hopper 26. A plurality of sheets of paper 21 can be set in the manual paper feed section 15 at once.

The manual paper feed tray 24 may be provided on a side surface of the housing 12 in such a way as to be openable and closable. The manual paper feed tray 24 in an opened state illustrated in FIG. 1 can support the stacked sheets of paper 21. The manual paper feed tray 24 supports the paper 21 in a state in which the paper 21 is exposed to the outside. The manual paper feed tray 24 may be provided obliquely in such a way that an end adjacent to the paper feed roller 25 is positioned on a lower level.

The paper feed roller 25 feeds, to the transport path 22, the uppermost sheet of paper 21 among the sheets of paper 21 set in the manual paper feed tray 24. The hopper 26 may be provided on the manual paper feed tray 24. The hopper 26 can push up the paper 21 set in the manual paper feed tray 24. The hopper 26 may push the paper 21 against the paper feed roller 25.

Detection Section

The detection section 16 detects the presence or absence of the paper 21 set in the manual paper feed section 15. The detection section 16 may be provided on the manual paper feed tray 24. The detection section 16 outputs a paper presence signal when there is paper 21 set in the manual paper feed section 15. The detection section 16 outputs a paper absence signal when there is no paper 21 set in the manual paper feed section 15. The detection section 16 may be, for example, a reflective optical sensor including a light projecting section (not illustrated) and a light receiving section (not illustrated). The detection section 16 may project light from below the set paper 21 and output the paper presence signal when light reflected by the paper 21 is received. The detection section 16 may output the paper absence signal when the light receiving section does not receive projected light.

Transport Section

The transport section 17 transports the paper 21 along the transport path 22. The transport section 17 may transport the paper 21 fed from the manual paper feed section 15 and the paper 21 fed from the accommodation cassette 13. The transport section 17 may include a separation roller 28, a transport roller 29, a discharge roller 30, an endless transport belt 31, and a pair of pulleys 32.

The separation roller 28 separates the paper 21 to be fed. The separation roller 28 separates the uppermost sheet of paper 21 from the stacked sheets of paper 21. The separation roller 28 pushes down the second uppermost and subsequent sheets of paper 21 toward the manual paper feed tray 24.

The transport roller 29 and the discharge roller 30 may transport the paper 21 by rotating while pinching the paper 21. At least one transport roller 29 may be provided on the transport path 22 upstream of the transport belt 31. The transport roller 29 transports the paper 21 toward the recording section 18. At least one discharge roller 30 may be provided on the transport path 22 downstream of the transport belt 31. The discharge roller 30 discharges the printed paper 21 to the stacker 19. The stacker 19 receives the transported paper 21.

The transport belt 31 is stretched over the pair of pulleys 32. The transport belt 31 faces the recording section 18 with the transport path 22 interposed therebetween. The transport belt 31 supports a portion of the paper 21 in a flat state. The transport belt 31 rotates in a state in which the paper 21 adheres to the transport belt 31, thereby transporting the paper 21.

The recording section 18 may include a plurality of nozzles 34 that eject the liquid. The recording section 18 may have a nozzle surface 35 in which the plurality of nozzles 34 are opened. The recording section 18 may be provided with the nozzle surface 35 inclined with respect to the horizontal plane. The recording section 18 performs printing on the paper 21 supported by the transport belt 31 by ejecting the liquid onto the paper 21. The printing is one means for recording information. The recording section 18 according to the present embodiment performs recording on the paper 21 by the printing. The recording section 18 may be a line printer or a serial printer. The line printer is a printer in which the recording section 18 has a wider width than the width of the paper and ejects the ink onto the paper without moving. The serial printer is a printer in which the recording section 18 is mounted on a carriage that moves in a predetermined direction, and the recording section 18 moves along with the movement of the carriage to eject the ink onto the paper.

Recording System

Figure 2:
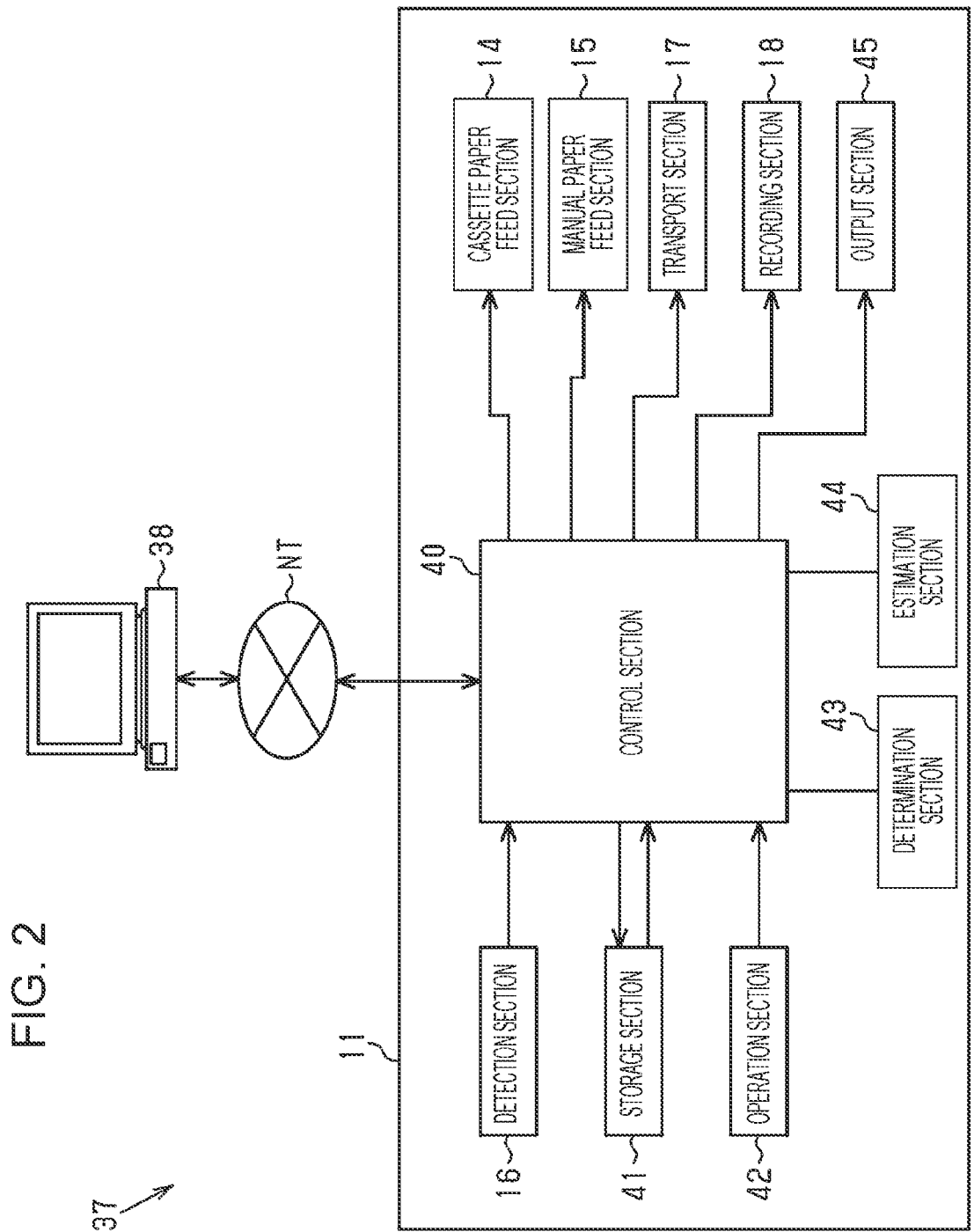
FIG. 2 is a schematic diagram of a recording system including the recording apparatus.

As illustrated in FIG. 2, the recording apparatus 11 may be included in a recording system 37. The recording system 37 may include a computer 38 and the recording apparatus 11. The computer 38 and the recording apparatus 11 may be able to communicate with each other via a network NT such as the Internet.

The recording apparatus 11 may include a control section 40, a storage section 41, an operation section 42, a determination section 43, an estimation section 44, and an output section 45. The control section 40 comprehensively controls driving of each mechanism in the recording apparatus 11 and controls various operations performed in the recording apparatus 11. The control section 40 can be configured as a circuit including one or more processors ($\alpha$) that execute various types of processing according to a computer program, one or more dedicated hardware circuits ($\beta$) that execute at least some of the various types of processing, or a combination ($\gamma$) thereof. Examples of the hardware circuit include an application specific integrated circuit. The processor includes a central processing unit (CPU) and a memory such as a random access memory (RAM) and a read only memory (ROM), and the memory stores a program code or instruction configured to cause the CPU to execute the processing. The memory, that is, a computer-readable medium, includes any readable medium that can be accessed by a general-purpose computer or a special-purpose computer.

Examples of the storage section 41 include a memory such as the RAM or ROM described above. The storage section 41 may be provided separately from the control section 40 or may be included in the control section 40. The storage section 41 stores various programs and various parameters. The control section 40 may function as the determination section 43 and the estimation section 44 by executing programs stored in the storage section 41. The recording apparatus 11 may include the determination section 43 and the estimation section 44. At least one of the determination section 43 or the estimation section 44 may be implemented by the computer 38 executing a program.

The operation section 42 may include a button, a panel, a switch, or the like for performing various operations of the recording apparatus 11. The output section 45 may output a determination result obtained by the determination section 43. The output section 45 may be capable of outputting information regarding the recording apparatus 11. The output section 45 may be a display that can output information in the form of an image, a video, characters, or the like. The output section 45 and the operation section 42 may be integrated with each other like a touch panel, for example. The output section 45 may be a speaker that can output information by voice, sound, or the like. The output section 45 may be a light that can output information with light. The light may output the determination result, for example, by illuminating a corresponding label. The output section 45 may be a communication device that outputs the determination result to an apparatus other than the recording apparatus 11. For example, the output section 45 may output information such as the determination result to the computer 38. The recording section 18 may output the determination result by printing the determination result on the paper 21 or the like. In this case, the recording section 18 also functions as the output section 45.

Monitoring Routine

Figure 3:
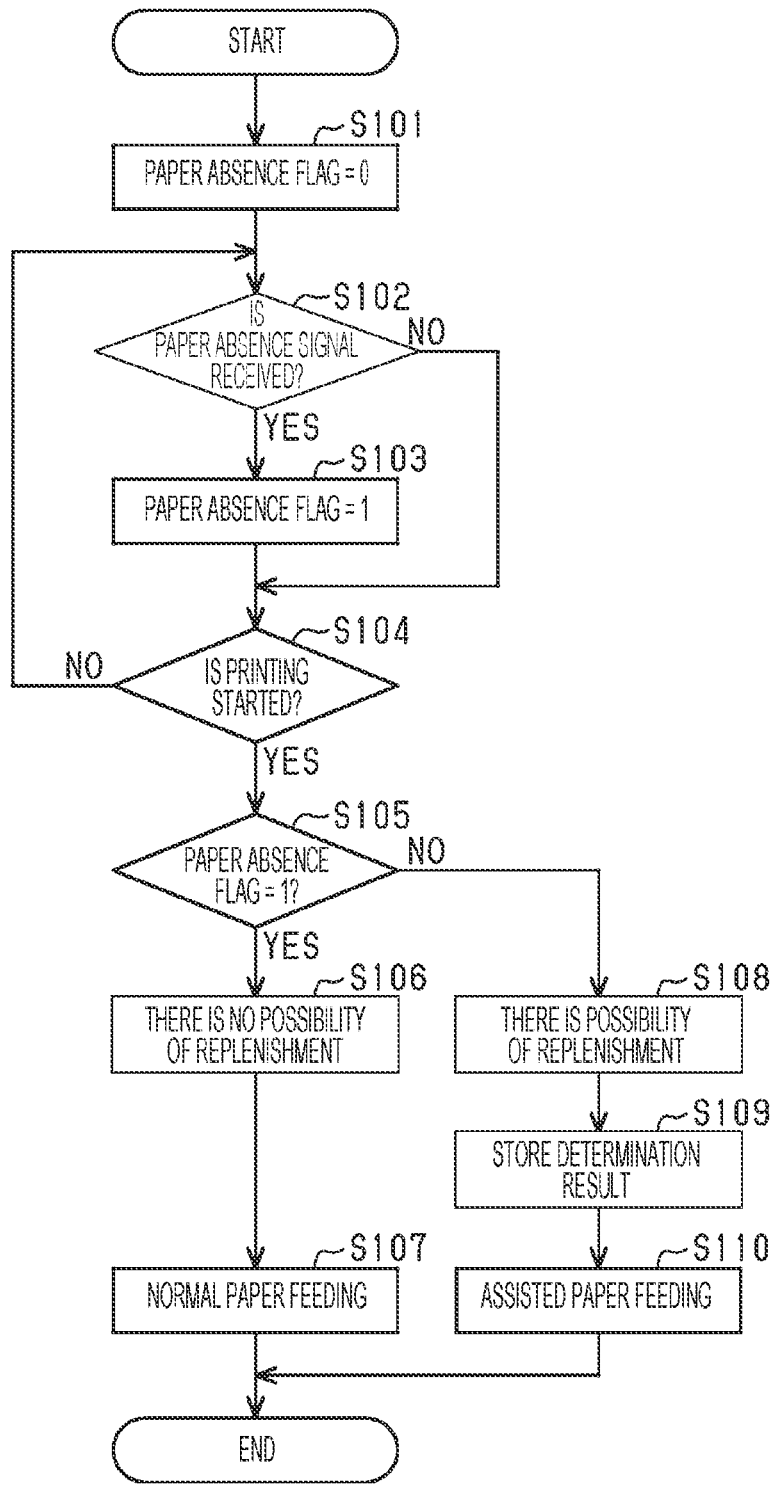
FIG. 3 is a flow chart illustrating a monitoring routine.

A monitoring routine illustrated in FIG. 3 may be performed at a timing when a power supply of the recording apparatus 11 is turned on, a timing when printing using the paper 21 set in the manual paper feed tray 24 is terminated, a timing when paper feeding by the manual paper feed section 15 is terminated, and the like.

As illustrated in FIG. 3, in step S101, the control section 40 initializes a paper absence flag stored in the storage section 41 to 0. In step S102, the control section 40 receives a signal from the detection section 16. When the received signal is the paper absence signal, affirmative determination (YES) is made in step S102, and the control section 40 advances the processing to step S103. In step S103, the control section 40 sets the paper absence flag to 1.

In step S102, when the received signal is the paper presence signal, negative determination (NO) is made in step S102, and the control section 40 advances the processing to step S104. In step S104, the control section 40 determines whether or not printing for which the manual paper feed section 15 is specified is started. When the printing is not started, negative determination (NO) is made in step S104, and the control section 40 advances the processing to step S102. That is, the control section 40 monitors whether or not there is no paper 21 in the manual paper feed tray 24 until the next printing is started.

When the printing is started, affirmative determination (YES) is made in step S104, and the control section 40 advances the processing to step S105. In step S105, the control section 40 confirms the paper absence flag.

When the paper absence flag is 1, affirmative determination (YES) is made in step S105, and the control section 40 advances the processing to step S106. In step S106, the control section 40 determines that there is no possibility of replenishment. In step S107, the control section 40 selects normal paper feeding and terminates the processing.

When the paper absence flag is 0, negative determination (NO) is made in step S105, and the control section 40 advances the processing to step S108. In step S108, the control section 40 determines that there is a possibility of replenishment. In step S109, the control section 40 stores the determination result in the storage section 41. In step S110, the control section 40 selects adaptive paper feeding and terminates the processing.

The control section 40 may cause the determination section 43 to perform a part of the monitoring routine. The control section 40 may cause the determination section 43 to perform steps S105, S106, and S108 in the monitoring routine. That is, the determination section 43 may determine whether or not there is a possibility of replenishment.

Paper Feed Routine

Figure 4:
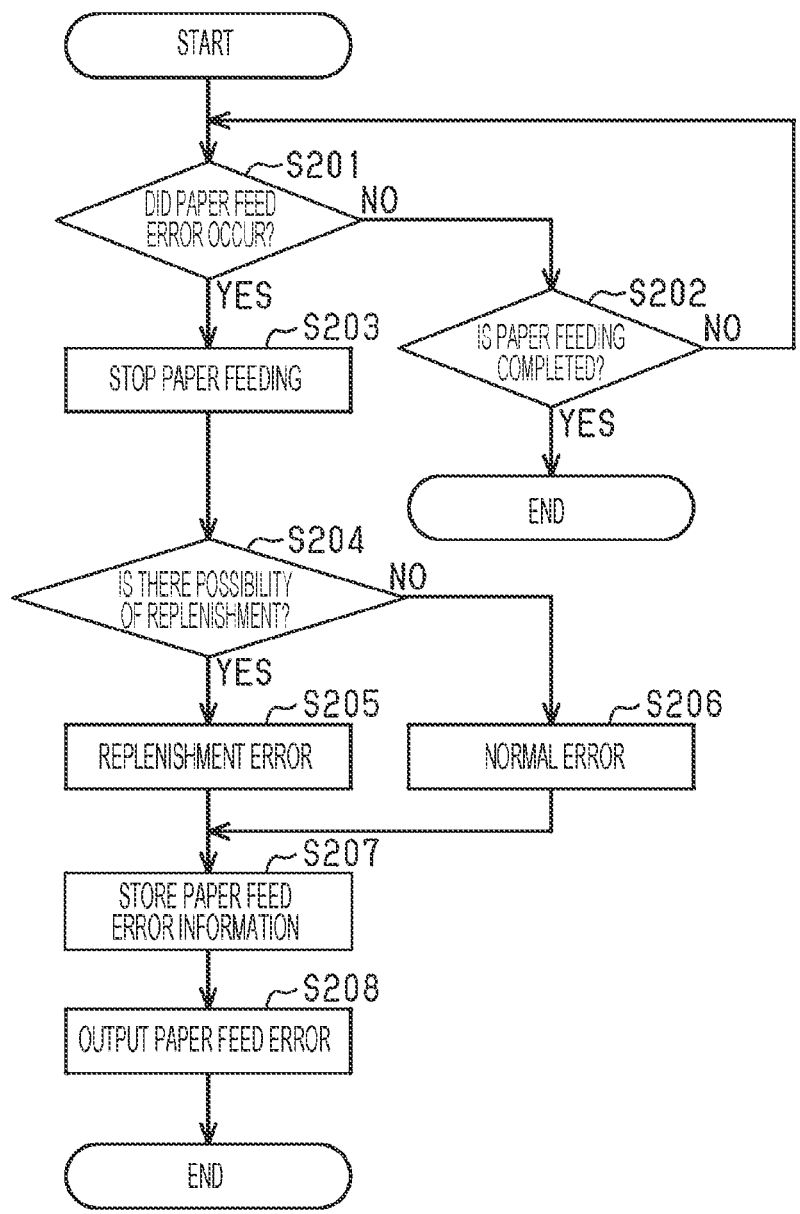
FIG. 4 is a flow chart illustrating a paper feed routine.

A paper feed routine illustrated in FIG. 4 may be performed at a timing when printing for which the paper 21 set in the manual paper feed tray 24 is specified is started, a timing when the manual paper feed section 15 starts paper feeding, and the like.

In step S201, the control section 40 determines whether or not a paper feed error occurred. When the paper feed error did not occur, negative determination (NO) is made in step S201, and the control section 40 advances the processing to step S202. In step S202, the control section 40 determines whether or not paper feeding is terminated. That is, when the feeding of the paper 21 used for a series of printing is completed, affirmative determination (YES) is made in step S202, and the control section 40 terminates the processing. When the paper feeding is not completed, negative determination (NO) is made in step S202, and the control section 40 advances the processing to step S201.

In step S201, when the paper feed error occurred, affirmative determination (YES) is made in step S201, and the control section 40 advances the processing to step S203. In step S203, the control section 40 stops the paper feeding by the manual paper feed section 15.

In step S204, the control section 40 determines whether or not there is a possibility of replenishment. Whether or not there is a possibility of replenishment can be determined based on whether or not the determination result is stored in the storage section 41. In other words, when there is a possibility that the paper 21 is replenished in the manual paper feed section 15, the determination result is stored in the monitoring routine before starting the paper feed routine.

When the determination result is stored, there is a possibility that the paper 21 is replenished. Therefore, affirmative determination (YES) is made in step S204, and the control section 40 advances the processing to step S205. In step S205, the control section 40 determines that a replenishment error occurred. The replenishment error is an error that cannot be denied as being an error associated with replenishment of the paper 21. The replenishment error is an error associated with the possibility of replenishment.

When the determination result is not stored, there is no possibility that the paper 21 is replenished. Therefore, negative determination (NO) is made in step S204, and the control section 40 advances the processing to step S206. In step S206, the control section 40 determines that a normal error occurred. The normal error is an error that occurs irrespective of the replenishment of the paper 21.

In step S207, the control section 40 stores paper feed error information in the storage section 41. Specifically, the control section 40 stores, as the paper feed failure information, information indicating which of the replenishment error and the normal error occurred. In step S208, the control section 40 causes, for example, the output section 45 to output information indicating that the paper feed error of the manual paper feed section 15 occurred, and terminates the processing.

Actions of Embodiment

The actions of the present embodiment will be described. The recording apparatus 11 performs recording according to printing request data. The recording apparatus 11 may acquire the printing request data from an external apparatus such as the computer 38, an external storage medium, or the like. The recording apparatus 11 may acquire the printing request data set by operating the operation section 42.

As illustrated in FIG. 1, the manual paper feed section 15 feeds the sheets of paper 21 set in the manual paper feed tray 24 to the transport path 22 one by one. When feeding of preceding paper 21p used in the previous printing is completed, the control section 40 stops driving of the paper feed roller 25 after a leading edge of continuation paper 21f, which is the next sheet of paper 21, passes the paper feed roller 25. That is, the continuation paper 21f stops in a state of being pinched between the paper feed roller 25 and the separation roller 28. At this time, the detection section 16 outputs the paper presence signal.

Addition of Paper

When adding the paper 21 to the manual paper feed section 15, a user first removes the remaining paper 21 from the manual paper feed tray 24. The user removes the paper 21 pinched between the paper feed roller 25 and the separation roller 28 by pulling the paper 21. The user loads the removed paper 21 and the paper 21 to be added in a stacked state on the manual paper feed tray 24.

Therefore, when the paper 21 is correctly set, the detection section 16 outputs the paper absence signal at a timing when the paper 21 is removed, and outputs the paper presence signal at a timing when the paper 21 is loaded on the manual paper feed tray 24. Therefore, when the paper 21 is correctly added, the storage section 41 stores 1 as the paper absence flag.

Paper Feed Error

When the paper 21 is replenished in the manual paper feed section 15 in a state in which the continuation paper 21f is pinched, there is a possibility that the paper feed error occurs in the next printing. When the paper feed error occurs, the paper 21 may experience damage such as wrinkles or tears.

The paper feed error in which a plurality of sheets of paper 21 are fed in a state of being stacked is also called double feeding. The control section 40 may determine that the double feeding is being performed when a load of a paper feed motor (not illustrated) for driving the paper feed roller 25 is greater than a threshold. The paper feed error in which the paper 21 is jammed and cannot be transported is also called a paper jam. For example, when the number of stacked sheets of paper 21 is small, the sheets of paper 21 may be transported in a state of being stacked. In this case, the consecutive sheets of paper 21 may be recognized as one large sheet of paper 21. The paper feed error in which the size of the paper 21 cannot be correctly recognized is also called a size mismatch.

Replenishment of Paper

In the following description, the paper 21 remaining between the continuation paper 21f and the manual paper feed tray 24 when the previous printing is completed is also called remaining paper 21r, and newly replenished paper 21 is also called replenished paper 21a.

Figure 5:
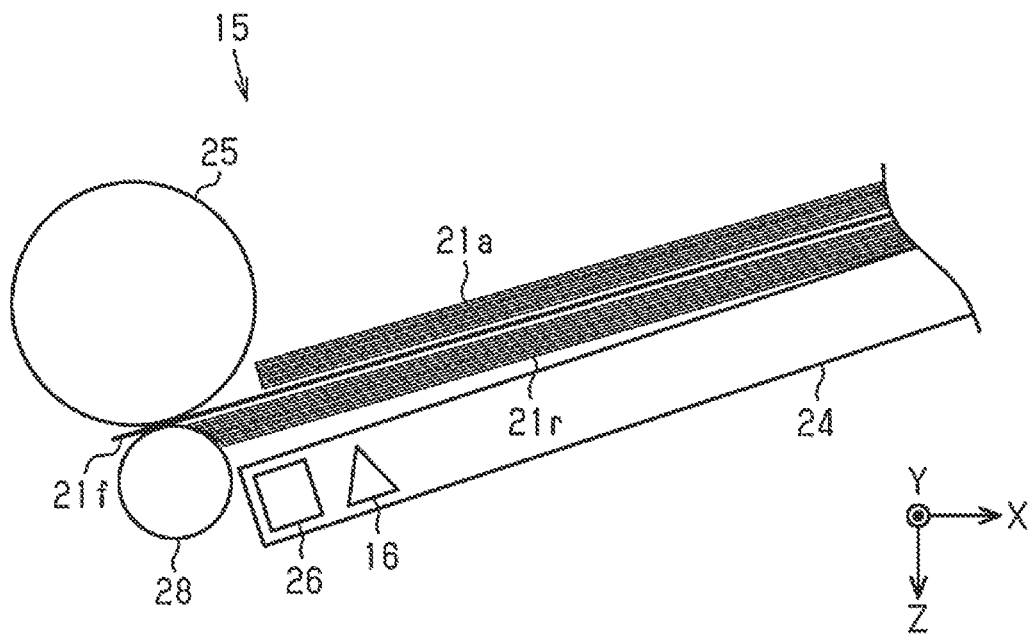
FIG. 5 is a schematic view illustrating a state in which paper is replenished on continuation paper.
Figure 6:
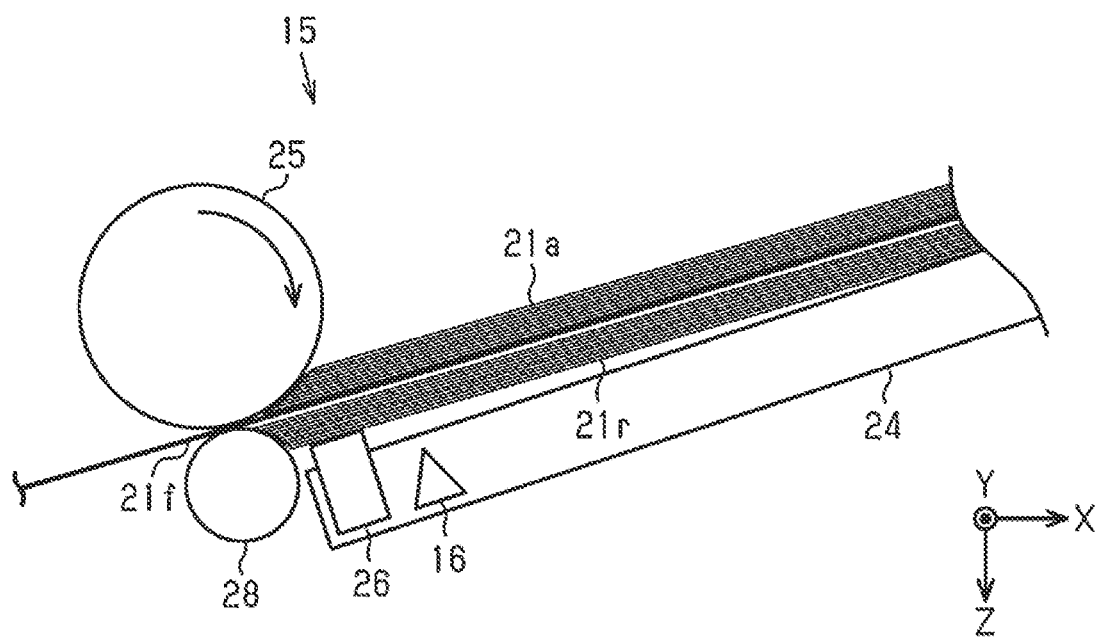
FIG. 6 is a schematic view when a paper feed roller rotates in a state illustrated in FIG. 5.

As illustrated in FIG. 5, the replenished paper 21a may be put on the continuation paper 21f. As illustrated in FIG. 6, when the next printing is started and the paper feed roller 25 rotates, the replenished paper 21a approaches the paper feed roller 25 in such a way as to be carried by the continuation paper 21f. The replenished paper 21a is fed together with the continuation paper 21f by coming into contact with the paper feed roller 25. As a result, the paper feed error may occur.

Figure 7:
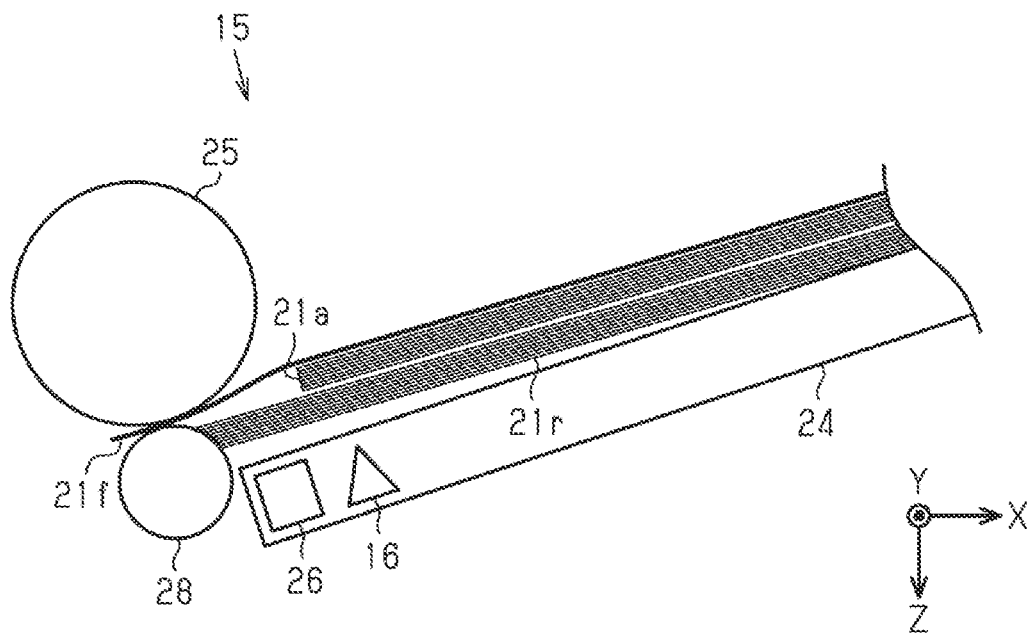
FIG. 7 is a schematic view illustrating a state in which paper is replenished between the continuation paper and remaining paper.
Figure 8:
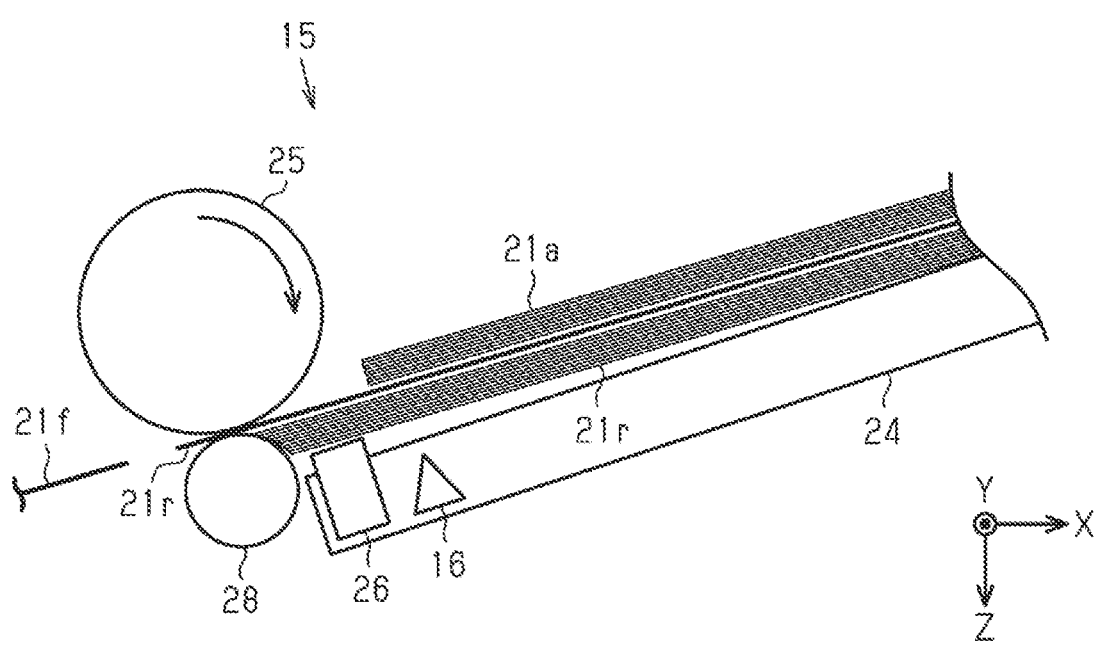
FIG. 8 is a schematic view when the paper feed roller rotates in a state illustrated in FIG. 7.

As illustrated in FIG. 7, the replenished paper 21a may be inserted between the continuation paper 21f and the remaining paper 21r. As illustrated in FIG. 8, when the next printing is started and the paper feed roller 25 rotates, the remaining paper 21r may be fed after the continuation paper 21f. Since the replenished paper 21a is put on the remaining paper 21r, a state similar to that illustrated in FIG. 6 may occur, resulting in the paper feed error.

Figure 9:
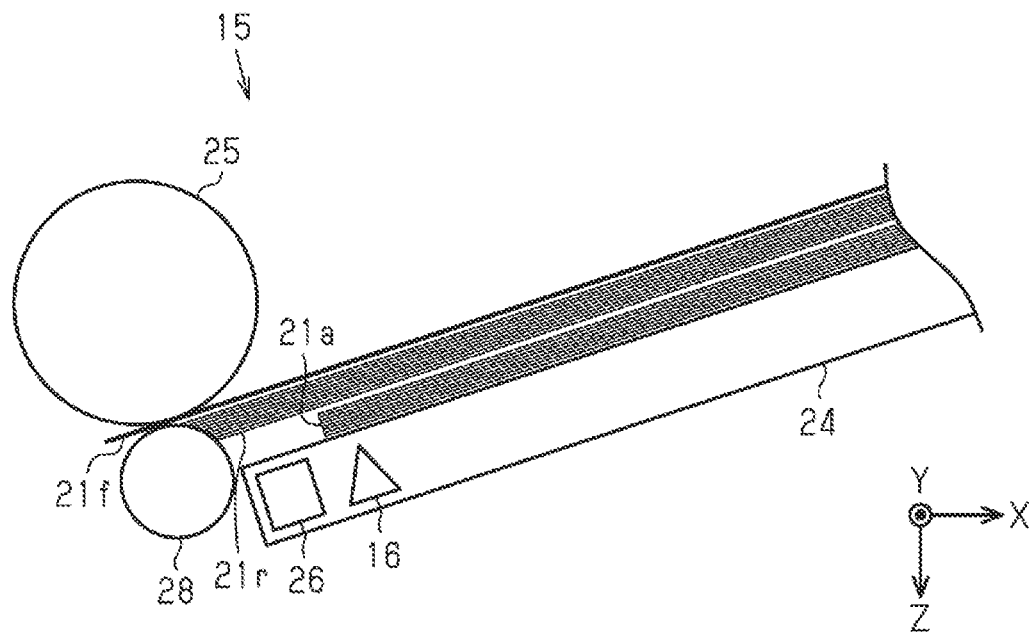
FIG. 9 is a schematic view illustrating a state in which paper is replenished under the remaining paper.

As illustrated in FIG. 9, the replenished paper 21a may be inserted under the remaining paper 21r. A posture of the remaining paper 21r is changed as the remaining paper 21r is lifted by the replenished paper 21a.

Figure 10:
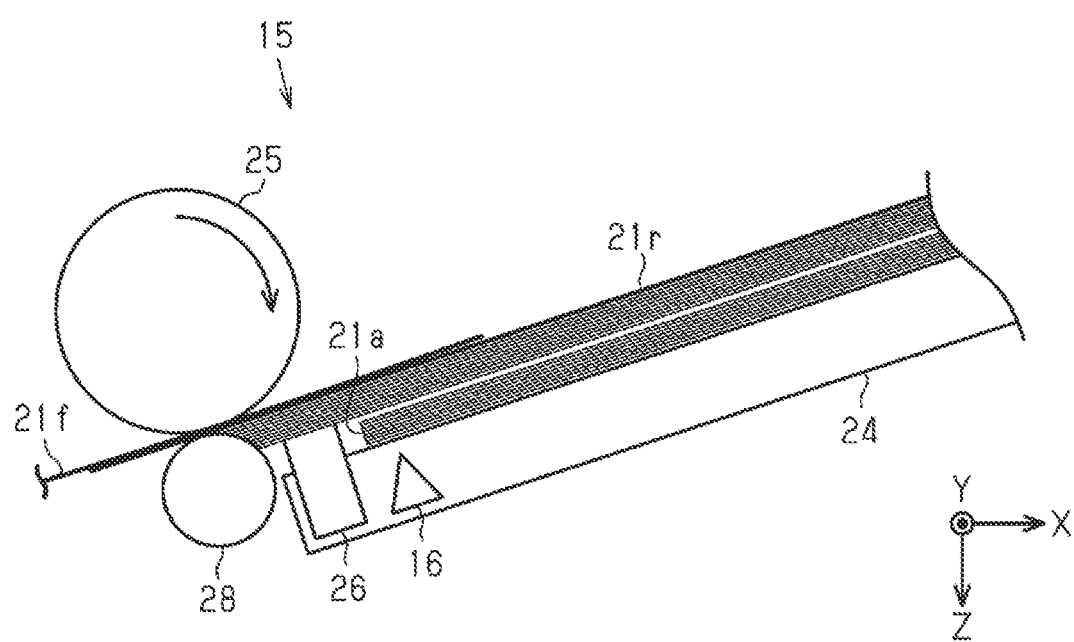
FIG. 10 is a schematic view when the paper feed roller rotates in a state illustrated in FIG. 9.

As illustrated in FIG. 10, when the next printing is started and the paper feed roller 25 rotates, the remaining paper 21r whose posture is changed passes over the paper feed roller 25 and the separation roller 28, causing the paper feed error.

As illustrated in FIGS. 5 to 10, when the paper 21 is replenished in the manual paper feed section 15, the paper 21 is present in the manual paper feed tray 24 until the next printing is started after the previous printing is terminated in any case. Therefore, the detection section 16 continues to output the paper presence signal. Therefore, when there is a possibility that the paper 21 is replenished, the storage section 41 stores 0 as the paper absence flag. The paper absence flag is also set to 0 when the next printing is started without replenishing the paper 21 after the previous printing is terminated.

The determination section 43 determines a replenishment possibility that the paper 21 is replenished in the manual paper feed section 15 based on the output of the detection section 16. The determination section 43 determines that there is no possibility of replenishment when the detection section 16 outputs the paper absence signal during a standby period from the termination of printing on the preceding paper 21p to the start of printing on the continuation paper 21f. The determination section 43 determines that there is a possibility of replenishment when the detection section 16 does not output the paper absence signal during the standby period.

The control section 40 performs the normal paper feeding when the determination section 43 determines that there is no possibility of replenishment. The control section 40 performs the adaptive paper feeding when the determination section 43 determines that there is a possibility of replenishment. The adaptive paper feeding may include at least one of decreasing transport speeds of the transport roller 29 and the paper feed roller 25 in comparison to the normal paper feeding, driving the transport roller 29 and the paper feed roller 25 to rotate in reverse, or increasing a torque of the separation roller 28 in comparison to the normal paper feeding.

The continuation paper 21f can be returned to the manual paper feed tray 24 by driving the transport roller 29 and the paper feed roller 25 to rotate in reverse. For example, when the paper feed roller 25 and the transport roller 29 are separated from each other, and the transport roller 29 is not in contact with the continuation paper 21f, the paper feed roller 25 may be driven to rotate in reverse, and the transport roller 29 does not have to be driven in reverse.

By decreasing the transport speeds of the transport roller 29 and the paper feed roller 25 and increasing the torque of the separation roller 28, the separation of the paper 21 can be facilitated. Therefore, the occurrence of the paper feed error and damage to the paper 21 due to the paper feeding error can be reduced by performing the adaptive paper feeding.

The storage section 41 may store the determination result of the determination section 43. The storage section 41 may store a determination result indicating that there is a possibility of replenishment, among the determination results. The storage section 41 may store the paper feed error information regarding the paper feed error in the manual paper feed section 15. The storage section 41 may store the determination result and the paper feed error information in association with each other.

The estimation section 44 may perform estimation based on information stored in the storage section 41. The estimation section 44 may estimate a state of a component based on at least one of the determination result or the paper feed error information stored in the storage section 41. The estimation may be performed by the estimation section 44 at a timing of maintenance, repair, or the like of the recording apparatus 11. For example, the paper feeding error also occurs when the performance of the paper feed roller 25, the hopper 26, the separation roller 28, or the like deteriorates. The estimation section 44 may estimate a state of a component such as the paper feed roller 25, the hopper 26, or the separation roller 28 in consideration of the paper feed error information stored in association with the determination result indicating that there is a possibility of replenishment, among pieces of paper feed error information. The control section 40 may output the necessity of adjustment of a mounting position of a component, replacement of a component, or the like based on the estimation result.

Effects of Embodiment

The effects of the present embodiment will be described.

(1) The determination section 43 determines the possibility of replenishment based on the output of the detection section 16. That is, the possibility of replenishment can be determined by using the detection section 16 for detecting the presence or absence of the paper 21 set in the manual paper feed section 15. The paper feeding can be performed according to whether or not there is a possibility of replenishment, and it is thus possible to suppress the occurrence of the paper feed error while suppressing complication of the configuration.

(2) The determination section 43 determines that there is no possibility of replenishment when the detection section 16 outputs the paper absence signal during the standby period. The determination section 43 determines that there is a possibility of replenishment when the detection section 16 does not output the paper absence signal. That is, when no paper 21 is replenished, and the paper 21 is set correctly, the detection section 16 outputs the paper absence signal. Specifically, when the paper 21 is removed from the manual paper feed section 15 and then set again in the manual paper feed section 15, the detection section 16 outputs the paper presence signal after outputting the paper absence signal. On the other hand, when the paper 21 is replenished, the detection section 16 continues to output the paper present signal. Therefore, the possibility of replenishment can be easily determined based on whether or not the detection section 16 outputs the paper absence signal.

(3) When it is determined that there is a possibility of replenishment, the control section 40 performs at least one of decreasing the transport speed of the transport roller 29, driving the transport roller 29 to rotate in reverse, or increasing the torque of the separation roller 28. Therefore, it is possible to reduce a possibility of the paper feed error due to the replenishment of the paper 21.

(4) The estimation section 44 estimates a state of a component based on the determination result of the determination section 43. That is, the estimation section 44 can estimate a state of a component in association with the possibility of replenishment. Therefore, the estimation section 44 can accurately estimate a state of a component.

(5) The estimation section 44 estimates a state of a component based on the possibility of replenishment as well as the paper feed error information. Therefore, it is possible to improve the accuracy in estimating a state of a component by the estimation section 44.

(6) The output section 45 outputs the determination result of the determination section 43. Therefore, it is possible to easily inform the user of the determination result.

Modifications

The present embodiment can be modified as follows. The present embodiment and the following modifications can be implemented in combination with each other within a technically consistent range.

The recording apparatus 11 may include a double feeding detection section (not illustrated) that detects the double feeding. The double feeding detection section may detect, for example, the thickness of the transported paper 21. The control section 40 may determine that the double feeding is being performed when the thickness of the paper 21 detected by the double feeding detection section is larger than a predetermined thickness.

The manual paper feed section 15 may make the continuation paper 21f be pinched by the hopper 26 and the paper feed roller 25 after the previous printing is terminated.

The recording apparatus 11 does not have to include the separation roller 28. The recording apparatus 11 may separate the paper 21 by, for example, a separation pad with a high frictional force. The recording apparatus 11 may make the continuation paper 21f be pinched between the paper feed roller 25 and the separation pad after the previous printing is terminated.

The recording apparatus 11 may include a first mechanism including the manual paper feed section 15 and a second mechanism including the recording section 18. The first mechanism and the second mechanism may be separate apparatuses.

The recording apparatus 11 may include the computer 38. That is, the recording system 37 may function as the recording apparatus. The recording apparatus 11 and the computer 38 may be directly connected by wire or wirelessly.

The recording system 37 may include a plurality of recording apparatuses 11. The recording system 37 may include a plurality of computers 38. The recording system 37 may include a server communicable via the network NT.

The recording apparatus 11 does not have to include the output section 45. The output section 45 may be provided separately from the recording apparatus 11. The recording system 37 may include the output section 45. The output section 45 such as a display may be provided in such a way as to be communicable with the recording apparatus 11 via the network NT.

The storage section 41 does not have to store at least one of the determination result of the determination section 43 or the paper feed error information.

The adaptive paper feeding may include, for example, prompting the user to reset the paper 21 by causing the output section 45 to output a message, waiting until the paper 21 is reset, and performing the normal paper feeding.

The detection section 16 may include a lever that interferes with the paper 21 set in the manual paper feed section 15. The lever may be moved by being pushed by the set paper 21. The detection section 16 may detect the presence or absence of the paper 21 set in the manual paper feed section 15 by detecting the position of the lever.

The detection section 16 may be a transmissive optical sensor. The light projecting section and the light receiving section may be provided in such a way that the paper 21 set in the manual paper feed section 15 is positioned between the light projecting section and the light receiving section. The detection section 16 may detect the presence or absence of the paper 21 set in the manual paper feed section 15 based on whether or not the light receiving section receives the light projected by the light projecting section.

The control section 40 does not have to set the paper absence flag. The determination section 43 may directly determine the possibility of replenishment of the paper 21 based on the detection result of the detection section 16. For example, the determination section 43 may determine that there is no possibility of replenishment of the paper 21 at a timing when the paper absence signal is received. The determination section 43 may determine that there is a possibility of replenishment of the paper 21 at a timing when printing is started without receiving the paper absence signal.

The recording apparatus 11 is not limited to an ink jet printer, and may be a laser printer, a thermal printer, a dot impact printer, a digital printing machine, or the like.

The recording apparatus may be a liquid ejecting apparatus that performs recording by ejecting a liquid other than ink. A state of the liquid ejected in the form of minute droplets from the liquid ejecting apparatus includes a granular state, a tear-like state, and a thread-like trailing state. It is sufficient if the liquid referred to here is any material as long as the liquid can be ejected from the liquid ejecting apparatus. For example, it is sufficient if the liquid is a substance in a liquid phase, and the liquid may include fluids such as a liquid with a high or low viscosity, sol, gel water, other inorganic solvents, organic solvents, solutions, liquid resins, liquid metals, and molten metals. The liquid includes not only a liquid as a state of a substance, but also a material in which particles of a functional material made of a solid substance such as pigments or metallic particles are dissolved in, dispersed in, or mixed with a solvent. Typical examples of the liquid include ink and liquid crystal as described in the above embodiment. Here, the ink includes general water-based inks and oil-based inks, and various other liquid compositions such as gel inks and hot-melt inks. Specific examples of the liquid ejecting apparatus include an apparatus that ejects a liquid containing a dispersed or dissolved material such as an electrode material or a coloring material used in manufacturing of a liquid crystal display, an electroluminescence display, a surface emitting display, a color filter, or the like. The liquid ejecting apparatus may be an apparatus that ejects a bioorganic substance used for biochip production, an apparatus that ejects a liquid as a sample used as a precision pipette, a fabric printing apparatus, a microdispenser, or the like. The liquid ejecting apparatus may be an apparatus that ejects lubricating oil with pinpoint precision to a precision machine such as a watch or a camera, or an apparatus that ejects, on a substrate, a transparent resin such as an ultraviolet curable resin for forming a micro hemispherical lens or an optical lens used in an optical communication element or the like. The liquid ejecting apparatus may be an apparatus that ejects an etchant such as an acid or alkali to etch a substrate or the like.

Definition

The expression "at least one" as used herein means "one or more" of desired options. As an example, the expression "at least one" as used herein means "only one option" or "both of the two options" when the number of options is two. As another example, the expression "at least one" used herein means "only one option" or "any combination of two or more options" when the number of options is three or more.

Supplementary Note

Hereinafter, the technical ideas and the actions and effects that can be grasped from the above-described embodiment and modifications are described.

(A) A recording apparatus that performs recording according to printing request data includes: a manual paper feed section in which a plurality of sheets of paper are settable at once; a detection section that detects the presence or absence of the paper set in the manual paper feed section; and a determination section that determines a possibility of replenishment of the paper in the manual paper feed section based on an output of the detection section.

With this configuration, the determination section determines the possibility of replenishment based on the output of the detection section. That is, the possibility of replenishment can be determined by using the detection section for detecting the presence or absence of the paper set in the manual paper feed section. The paper feeding can be performed according to whether or not there is a possibility of replenishment, and it is thus possible to suppress the occurrence of the paper feed error while suppressing complication of the configuration.

(B) In the recording apparatus, the detection section may output a paper presence signal when there is paper set in the manual paper feed section, and output a paper absence signal when there is no paper set in the manual paper feed section, and the determination section may determine that there is no possibility of replenishment when the detection section outputs the paper absence signal during a standby period from termination of printing on preceding paper to start of printing on continuation paper, and determine that there is a possibility of replenishment when the detection section does not output the paper absence signal during the standby period.

With this configuration, the determination section determines that there is no possibility of replenishment when the detection section outputs the paper absence signal during the standby period. The determination section determines that there is a possibility of replenishment when the detection section does not output the paper absence signal. That is, when no paper is replenished, and the paper is set correctly, the detection section outputs the paper absence signal. Specifically, when the paper is removed from the manual paper feed section and then set again in the manual paper feed section, the detection section outputs the paper presence signal after outputting the paper absence signal. On the other hand, when the paper is replenished, the detection section continues to output the paper present signal. Therefore, the possibility of replenishment can be easily determined based on whether or not the detection section outputs the paper absence signal.

(C) The recording apparatus may further include: a separation roller that separates the paper to be fed; a recording section that performs recording on the paper; a transport roller that transports the paper toward the recording section; and a control section, in which when the determination section determines that there is a possibility of replenishment, the control section may perform at least one of decreasing a transport speed of the transport roller, driving the transport roller to rotate in reverse, or increasing a torque of the separation roller.

With this configuration, when it is determined that there is a possibility of replenishment, the control section performs at least one of decreasing the transport speed of the transport roller, driving the transport roller to rotate in reverse, or increasing the torque of the separation roller. Therefore, it is possible to reduce a possibility of the paper feed error due to the replenishment of the paper.

(D) The recording apparatus may further include: a storage section that stores a determination result of the determination section; and an estimation section that performs estimation based on information stored in the storage section, in which the storage section may store the determination result indicating that there is a possibility of replenishment, and the estimation section may estimate a state of a component based on the determination result stored in the storage section.

With this configuration, the estimation section estimates a state of a component based on the determination result of the determination section. That is, the estimation section can estimate a state of a component in association with the possibility of replenishment. Therefore, the estimation section can accurately estimate a state of a component.

(E) In the recording apparatus, the storage section may store paper feed error information regarding a paper feed error in the manual paper feed section, and the estimation section may estimate the state of the component based on the determination result and the paper feed error information stored in the storage section.

With this configuration, the estimation section estimates a state of a component based on the possibility of replenishment as well as the paper feed error information. Therefore, it is possible to improve the accuracy in estimating a state of a component by the estimation section.

(F) The recording apparatus may further include an output section that outputs the determination result obtained by the determination section.

With this configuration, the output section outputs the determination result of the determination section. Therefore, it is possible to easily inform the user of the determination result.

What is claimed is:

1. A recording apparatus that performs recording according to printing request data, the recording apparatus comprising:
    a manual paper feed section in which a plurality of sheets of paper are settable at once;
    a detection section configured to detect a presence or absence of the paper set in the manual paper feed section;
    a separation roller configured to separate a paper to be fed;
    a transport roller configured to transport the paper;
    a determination section configured to determine a possibility of replenishment of the paper in the manual paper feed section based on an output of the detection section; and
    a control section, where when determination section determines that there is a possibility of replenishment, the control section decreases a transport speed of the transport roller and increases a torque of the separation roller.

2. The recording apparatus according to claim 1, wherein the detection section outputs a paper presence signal when there is paper set in the manual paper feed section, and outputs a paper absence signal when there is no paper set in the manual paper feed section, and
    the determination section determines that there is no possibility of replenishment when the detection section outputs the paper absence signal during a standby period from termination of printing on preceding paper to start of printing on continuation paper, and determines that there is a possibility of replenishment when the detection section does not output the paper absence signal during the standby period.

3. The recording apparatus according to claim 1, further comprising:
    a recording section configured to perform recording on the paper,
    wherein the control section is further configured to drive the transport roller to rotate in reverse so as to return a fed paper to the manual paper feed tray.

4. The recording apparatus according to claim 1, further comprising:
    a storage section that stores a determination result of the determination section; and
    an estimation section that performs estimation based on information stored in the storage section,
    wherein the storage section stores the determination result indicating that there is a possibility of replenishment, and
    the estimation section estimates a state of a component based on the determination result stored in the storage section.

5. The recording apparatus according to claim 4, wherein the storage section stores paper feed error information regarding a paper feed error in the manual paper feed section, and
    the estimation section estimates the state of the component based on the determination result and the paper feed error information stored in the storage section.

6. The recording apparatus according to claim 1, further comprising an output section that outputs the determination result obtained by the determination section.

7. A method of controlling a recording apparatus including a recording section performing recording on a recording medium, a manual paper feed section in which a plurality of sheets of paper are settable at once, and a detection section configured to detect a presence or absence of the paper set in the manual paper feed section, a separation roller configured to separate a paper to be fed, a transport roller configured to transport the paper, the method comprising:
    a determination step that determines a possibility of replenishment of the paper in the manual paper feed section based on an output of the detection section, and
    a control step of decreasing a transport speed of the transport roller and increasing a torque of the separation roller when it is determined that there is a possibility of replenishment of the paper in the manual paper feed section.

* * * * *